(12) United States Patent
Grosse-Plankermann et al.

(10) Patent No.: US 9,067,611 B2
(45) Date of Patent: Jun. 30, 2015

(54) SEAT BENCH TRANSPORT DEVICE

(75) Inventors: Peter Grosse-Plankermann, Hamburg (DE); Thomas Bardenhagen, Hamburg (DE); Uwe Pietz, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 210 days.

(21) Appl. No.: 13/613,861

(22) Filed: Sep. 13, 2012

(65) Prior Publication Data

US 2013/0249178 A1   Sep. 26, 2013

Related U.S. Application Data

(60) Provisional application No. 61/533,809, filed on Sep. 13, 2011.

(30) Foreign Application Priority Data

Sep. 13, 2011   (DE) .......................... 10 2011 082 602

(51) Int. Cl.
| | |
|---|---|
| B62B 1/00 | (2006.01) |
| B62B 3/02 | (2006.01) |
| B62B 3/16 | (2006.01) |
| B62B 3/04 | (2006.01) |
| B62B 3/10 | (2006.01) |

(52) U.S. Cl.
CPC ... *B62B 3/02* (2013.01); *B62B 3/16* (2013.01); *B62B 3/04* (2013.01); *B62B 3/10* (2013.01); B62B 2202/32 (2013.01); B62B 2203/44 (2013.01)

(58) Field of Classification Search
USPC ............. 280/35, 47.34, 47.24, 47.35, 47.131, 280/79.11, 79.3, 79.7, 33.998, 33.991; 297/130; 248/157, 424, 429, 430
See application file for complete search history.

(56) References Cited

U.S. PATENT DOCUMENTS

| | | | |
|---|---|---|---|
| 3,173,708 A | | 3/1965 | Machielse et al. |
| 4,646,657 A | | 3/1987 | Zollinger |
| 4,934,720 A | * | 6/1990 | Dobron ...................... 280/79.11 |
| 5,205,571 A | * | 4/1993 | Geier et al. ................ 280/47.35 |
| 5,599,031 A | * | 2/1997 | Hodges ........................ 280/79.11 |
| 5,678,973 A | * | 10/1997 | Cox .............................. 414/341 |
| 5,927,731 A | * | 7/1999 | Clarke .......................... 280/79.7 |

(Continued)

FOREIGN PATENT DOCUMENTS

| | | |
|---|---|---|
| CN | 2873560 | 2/2007 |
| CN | 201951938 | 8/2011 |

(Continued)

OTHER PUBLICATIONS

Chinese Office Action, Nov. 4, 2014.

*Primary Examiner* — J. Allen Shriver, II
*Assistant Examiner* — James M Dolak
(74) *Attorney, Agent, or Firm* — Greer, Burns & Crain Ltd.

(57) ABSTRACT

A seat bench transport device for transporting a bench of seats for a vehicle, comprising a chassis, a retaining rail pair that is arranged on the chassis and including two retaining rails extending parallel to one another for accommodating seat bench feet. The lengthwise sides of these rails that face one another are open at least in sections and the lengthwise sides thereof that face away from one another each have at least one locking section. A displacement mechanism moves the retaining rails transversely relative to one another.

15 Claims, 13 Drawing Sheets

(56) References Cited

U.S. PATENT DOCUMENTS

| | | | | |
|---|---|---|---|---|
| 6,010,296 | A  * | 1/2000 | Enders | 414/346 |
| 6,474,245 | B2 * | 11/2002 | Richard | 108/54.1 |
| 6,955,368 | B2 * | 10/2005 | Bakhoum | 280/79.3 |
| 7,213,820 | B2 * | 5/2007 | Drummond | 280/79.11 |
| 7,487,981 | B2 * | 2/2009 | Cromie | 280/79.11 |
| 7,503,571 | B2 * | 3/2009 | Cromie | 280/79.11 |
| 2002/0100396 | A1 | 8/2002 | Richard | |
| 2007/0095596 | A1 | 5/2007 | Beneker et al. | |

FOREIGN PATENT DOCUMENTS

| | | |
|---|---|---|
| DE | 10 2006 062 303 | 7/2008 |
| JP | 2004352081 | 12/2004 |
| JP | 2007126103 | 5/2007 |

* cited by examiner

Prior art

SEAT BENCH TRANSPORT DEVICE

CROSS-REFERENCES TO RELATED APPLICATIONS

This application claims the benefit of the U.S. Provisional Application No. 61/533,809, filed on Sep. 13, 2011, and of the German patent application No. 10 2011 082 602.5 filed on Sep. 13, 2011, the entire disclosures of which are incorporated herein by way of reference.

BACKGROUND OF THE INVENTION

The invention relates to a seat bench transport device for transporting a seat bench for a transport vehicle.

Figure 1:
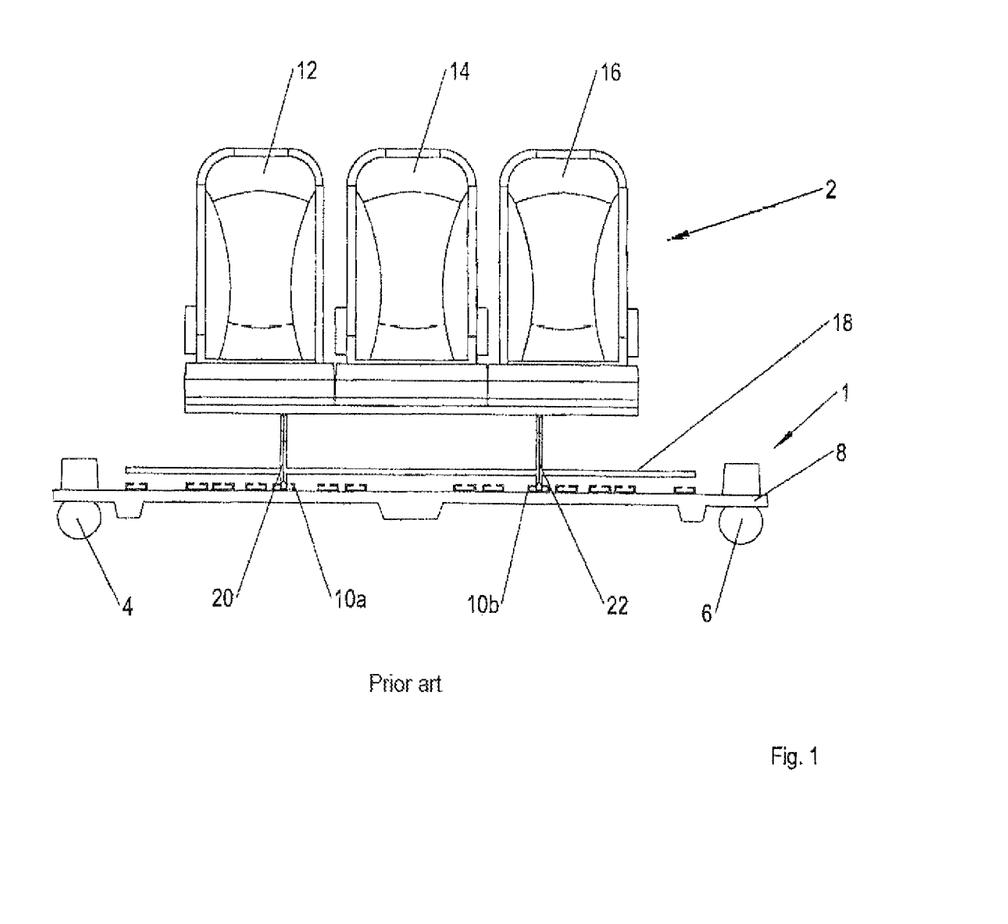
FIG. 1 a seat bench transport device according to the prior art.

Seat benches for use as seating in aircraft are usually transported to the aircraft on a mobile outside device, then loaded onto a mobile inside device and moved with this inside the aircraft fuselage to their respective installation positions. A conventional outside device for transporting a seat bench to the aircraft is shown in FIG. 1. This outside device 1 for transporting a seat bench 2 comprises a pallet 8 that is movable on caster pairs 4, 6, and on which a plurality of seat rail pairs is mounted securely in the transverse position. Each seat rail pair includes two seat rails 10a, 10b, arranged parallel to one another, which correspond to a distance between the rails in the aircraft. In this way, a large number of different seat benches 2 can be transported with the outside device 1. The seat bench 2 shown comprises three seats 12, 14, 16 with a shared seat support beam 18, whose seat bench feet for example can only be accommodated in one of the seat rail pairs 10a, 10b.

For transporting seat bench 2, seat bench feet 20, 22 are inserted into seat rails 10a, 10b transversely relative to pallet 8 and then secured in place via a locking mechanism, which is not shown. In order to transfer seat bench 2 from the outside device to the inside device inside the aircraft, the locking mechanism is released and seat bench 2 is slid out of seat rails 10a, 10b transversely relative to pallet 8.

However, inserting the seat benches in the seat rails is very time-consuming. In addition, the locking mechanism regularly catches when it is opened, causing further delays. Moreover, the seat rails, seat bench feet and the locking mechanism can be damaged as a result of this catching. It is also disadvantageous that seat benches with asymmetrical seat support beams cause the device's center of gravity to shift, making the outside device more difficult to move.

SUMMARY OF THE INVENTION

The object of the invention is to produce a seat bench transport device that eliminates the disadvantages described in the preceding and enables transportation of seat benches having differently spaced seat bench feet.

This object is solved with a seat bench transport device having the features of claim 1.

A seat bench transport device according to the invention for transporting a seat bench for a vehicle includes a chassis, a retaining rail pair disposed on the chassis, including two retaining rails that extend parallel to one another to accommodate seat bench feet, the lengthwise sides of these rails that face one another being open at least in sections and the lengthwise sides thereof that face away from one another each having at least one locking section, and a displacement mechanism for moving the retaining rails transversely relative to one another.

Because the retaining rails are movable transversely relative to one another, individual distances between seat bench rails may be simulated, so that seat benches of any kind may be transported. The seat bench transport device according to the invention thus constitutes a universal transport tool for all seat benches. Since the retaining rails are open at least in sections along the lengthwise side facing the other rail, the seat benches may be deposited on the chassis without difficulty. The laborious, time-consuming activity of sliding the seat benches in the lengthwise or crosswise direction of the seat bench transport device is no longer necessary. Since each of the retaining rails has at least one locking section on the longitudinal side thereof facing away from the other rail, the seat benches are automatically secured in place when the retaining rails on the seat bench transport device are moved together, and automatically released when the retaining rails are moved apart. This also saves installation time. Moreover, the arrangement prevents the retaining rails from being damaged and/or the seat benches from becoming caught in the retaining rails. The seat bench transport device is also ideally suitable for use inside the vehicle, so that time-consuming reloading of the seat benches onto a second transport device is not necessary and this also reduces installation time.

The retaining rails are preferably movable simultaneously. This enables maximum movement of the retaining rails relative to one another in a single operation, so that the seat benches may be rapidly secured and rapidly released again. Alternatively, however, the retaining rails may also be separately adjustable.

In a preferred embodiment, the displacement mechanism is equipped with two threaded rods aligned in the direction of displacement, each of which is allocated to a retaining rail, and a gearwheel that is disposed between the threaded rods and meshes with them, and an actuating element for driving the gearwheel. This embodiment is technically simple to construct and extremely sturdy, which is to say not prone to malfunction.

In another embodiment, the displacement mechanism is equipped with a link disk, guide bolts on the retaining rail side for transmitting a rotating motion of the link disk to the retaining rails, and an actuating element for driving the link disk. This embodiment is also technically simple to construction and very sturdy.

In order to enable the opening and closing movement of the retaining rails to be effected evenly when the actuating element is operated, the spiral slots converge radially from the outside towards the inside. A pinion that is connected to the gearwheel or the link disk is advantageously supported on an axis of rotation of the gearwheel and is also in operative connection with the actuating element. The pinion is easy to mount on the axis of rotation of the gearwheel. In addition, the link disk may particularly have any outer contour, so that it is adaptable to the spiral slots in instances where unoccupied disk sections may be removed from the spiral slots. A preferred link disk is for example oval in shape.

The actuating element may be a lever with a handle, which is attached to a segment of the gearwheel of the displacement mechanism to transmit a rotary movement of the lever to the pinion. The transmission enables maximum relative movement of the retaining rails towards one another for minimum rotary movement, thus enabling both the disposal of the seat benches on the seat bench transport device and the release thereof to be accomplished more quickly.

The displacement mechanism preferably has a positioning disk, in which a plurality of arc slots is provided for guiding the handle, each of which has an arc length that corresponds to a travel distance between an open position and a closed position of the retaining rails for each seat bench rail distance. This enables the lever to be moved between a defined open or releasing position and a defined closed or locking position, which makes removal and locking of the respective seat bench considerably easier.

Removal of the respective seat bench may be rendered simpler still if the retaining rails are spring-biased in the opening direction, so that they are able to move apart automatically.

The arc slots may be radially offset from each other, while at the same time adjacent arc slots adjoin each other radially, and the handle is shiftable in the lengthwise direction of the lever. Limit stops for the lever movements are defined by the relative radial offset, which correspond uniquely to the locking positions and release positions. The radial interconnections between adjacent arc slots mean that adjustments for changing rail distances may be made quickly.

In order to prevent inadvertent opening of the retaining rails, the lever may be secured in the respective locking position for the retaining rails.

Securing may be assured for example by creating at least one securing drillhole in each arc slot to accommodate a securing pin of the handle.

Alternatively, each of the arc slots may be constructed with a shoulder. This variant enables reliable locking with a smaller number of components, since a mechanism for inserting and removing a securing pin may be dispensed with. In this variant, for example a crossbar, a threaded bolt or similar may be used as the handle.

In order to be able to set the optimal position of the center of gravity of the seat bench transport device even for seat benches with asymmetrical support beams, casters on the chassis may be adjustable relative to each other in the direction of travel of the retaining rails.

In a technically simple variant, the casters are disposed on telescopic arms, which are displaceable along a base frame of the chassis.

In order to enable multiple seat bench transport devices to be stacked on top of each other, it is advantageous if the seat bench transport device is furnished with caster recesses to accommodate the casters of a seat bench transport device stacked on top of it. A stacking capability particularly saves space when the devices are stored and enables a number of seat bench transport devices to be moved conveniently when they are not in use.

BRIEF DESCRIPTION OF THE DRAWINGS

Further advantageous embodiments of the invention are the object of the additional dependent claims.

In the following, preferred embodiments of the invention will be explained in greater detail with reference to diagrammatic representations. These show.

DETAILED DESCRIPTION OF THE PREFERRED EMBODIMENTS

The same structural elements bear the same reference numbers, although for the sake of clarity not all of the elements are identified with their reference number in some of the figures.

Figure 2:
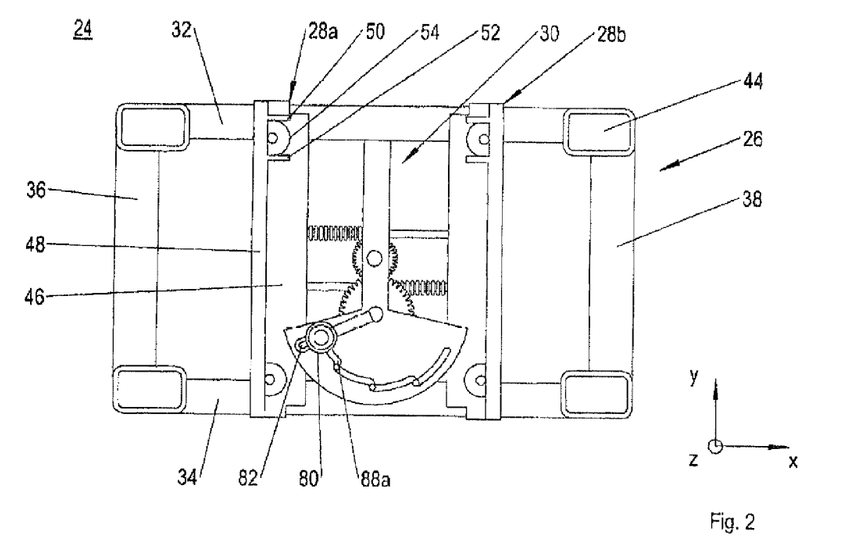
FIGS. 2, 3 and 4 a first embodiment of a seat bench transport device of the invention, FIG. 5 a detail from the first embodiment, FIG. 6 a plurality of stacked seat bench transport devices of the invention, FIGS. 7, 8, 9 and 10 an operating mechanism of the seat bench transport device with reference to the first embodiment, FIGS. 11, 12 and 13 the first embodiment with caster pairs displaced relative to each other, FIGS. 14 and 15 a second embodiment of the seat bench transport device of the invention, FIG. 16 a detail from the second embodiment, FIGS. 17 and 18 a third embodiment of the seat bench transport device of the invention, FIG. 19 a detail from the third embodiment, FIG. 20 a detail from a fourth embodiment of the seat bench transport device of the invention, and FIGS. 21 and 22 a fifth embodiment of the seat bench transport device of the invention.
Figure 3:
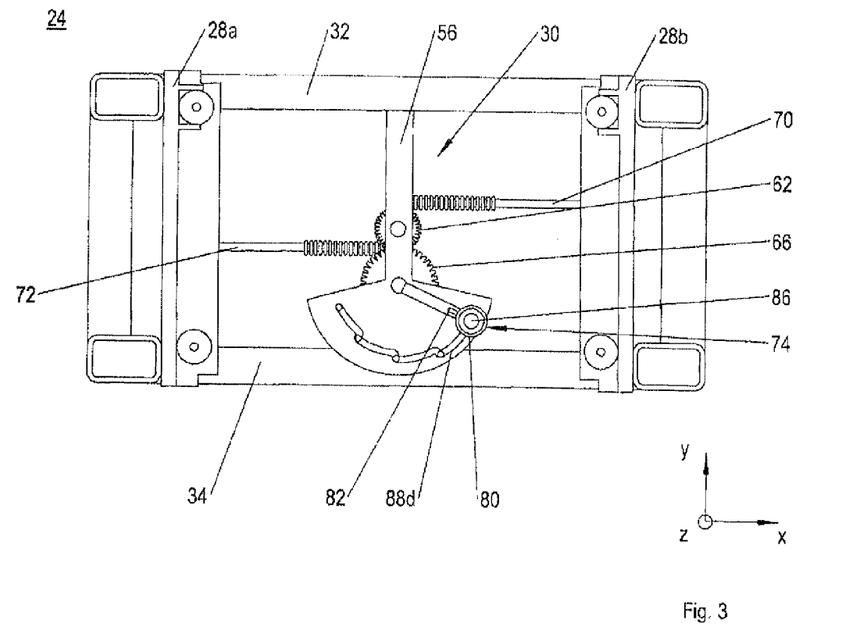
Figure 4:
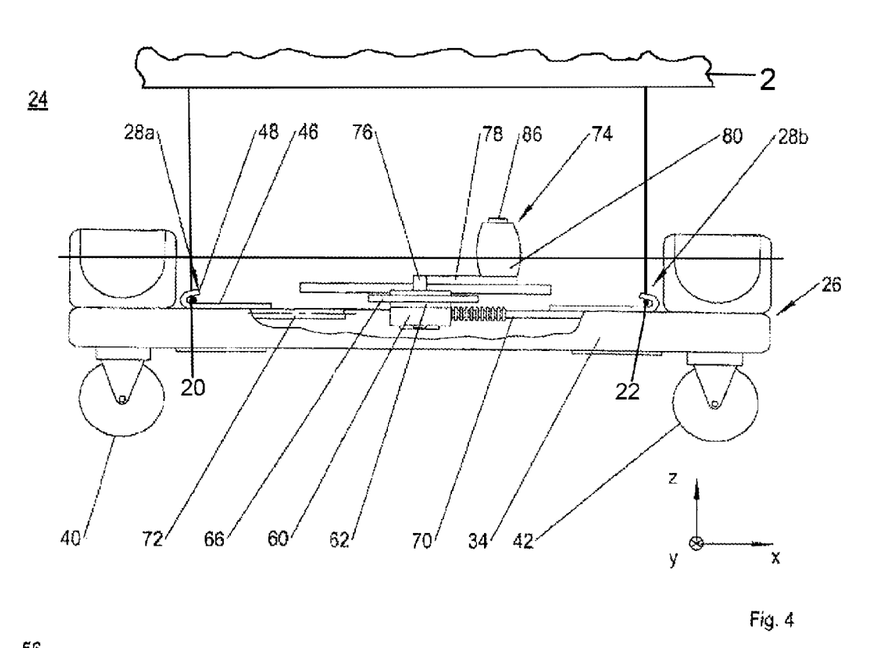
Figure 5:
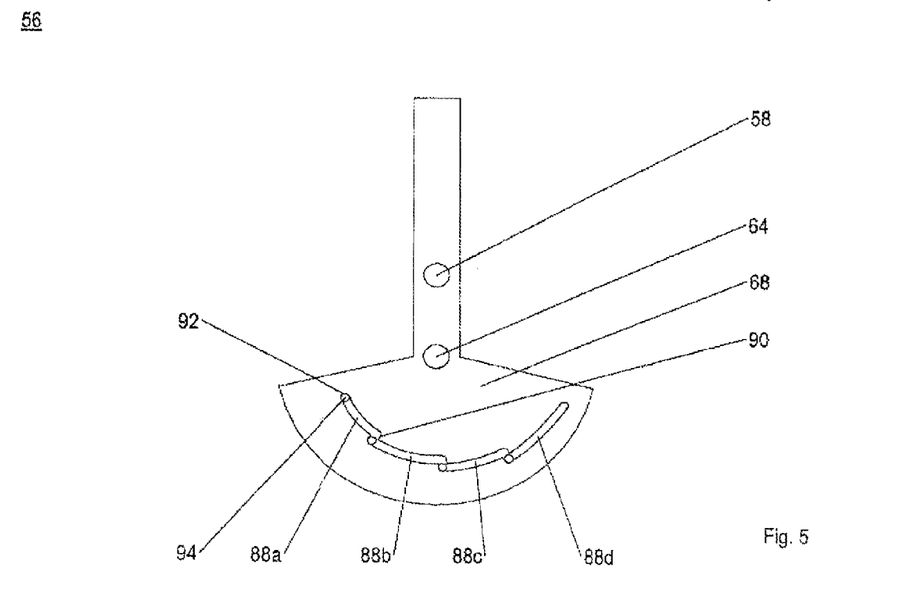

In the plan views of FIGS. 2 and 3, in the side view of FIG. 4, and in the detail view of FIG. 5, a first embodiment of a seat bench transport device 24 is shown. This comprises a chassis 26, two retaining rails 28a, 28b and a displacement device 30 for moving retaining rails 28a, 28b in opposite directions.

Chassis 26 comprises a base frame, which is formed by two side members 32, 34 and two cross members 36, 38 which connect side members 32, 34 to one another at the extremities thereof. Side members 32, 34 define a longitudinal direction x of seat bench transport device 1 and cross members 36, 38 define a transverse direction y of seat bench transport device 1.

In order to move chassis 26, as shown in FIG. 4 seat bench transport device 1 is equipped with two caster pairs 40, 42, which when view in transverse direction y comprise two casters arranged one beside the other.

Figure 6:
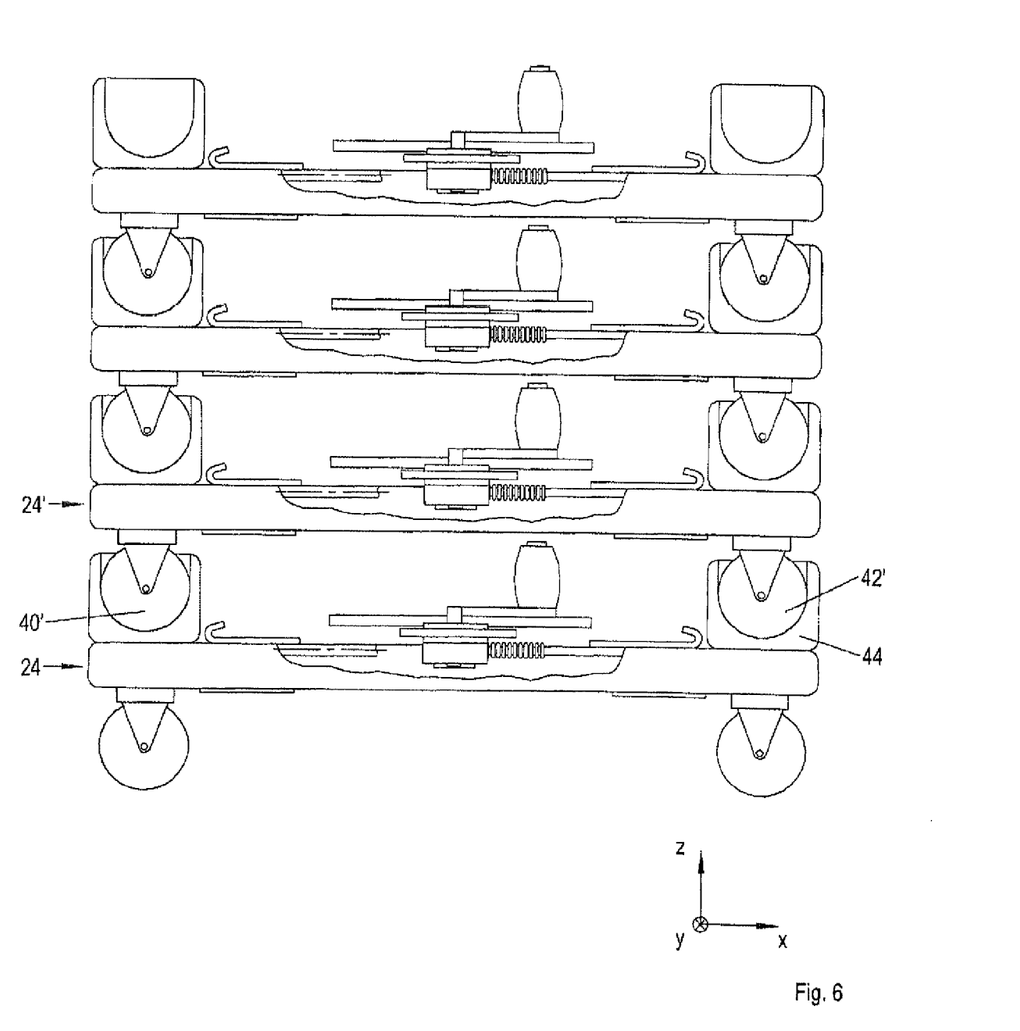

In order to stack multiple seat bench transport devices 24, 24' on top of each other in vertical direction z, seat bench transport device 24 has four cup-shaped caster recesses 44 to accommodate one caster each of caster pairs 40', 42' on the upper bench transport device 24' (FIG. 6).

As indicated by the numbered elements in FIG. 2, retaining rails 28a, 28b extend in transverse direction y. They are guided at their extremities in lengthwise direction x on side members 32, 34 and are displaceable in longitudinal direction x of seat bench transport device 24 from a position of small separation (FIG. 2) to a position of large separation (FIG. 3) relative to one another and back. Retaining rails 28a, 28b are preferably spring-biased in the opening direction. The longitudinal side of each that faces the other is of open design and the longitudinal side of each that faces away from the other is closed. In particular, as is shown in FIG. 4, each has a hook-like profile with a sliding portion 46 that is movable along side member 32, 34 and a locking portion 48 that extends at an angle and away from side members 32, 34. Locking portions 48 serve to hook around a portion of the seat bench feet 20, 22 (FIG. 4) to secure the seat benches (shown schematically at 2 in FIG. 4) in lengthwise direction x on seat bench transport device 24. In order to secure the seat benches 2 in transverse direction y, opposite sections of retaining rails 28a, 28b each have two for example weblike limiters 50, 52 at a distance from one another in transverse direction y, as indicated by the numbered elements in FIG. 2, and these limiters define a seating space 54 for inserting a seat bench foot 20, 22.

As indicated by the numbered elements in FIG. 3, displacement mechanism 30 has a cross member 56, a gear assembly and a positioning system.

Cross member 56 extends in transverse direction y and the end sections thereof are connected to the middle of side members 32, 34 as illustrated in FIG. 3. This cross member serves particularly to support the gear assembly. As is shown in FIG. 5, it has an axis of rotation drillhole 58 designed to define an axis of rotation for a gearwheel 60 and a pinion 62 of the gear assembly, and a pivot axis drillhole 64 designed to define a pivot axis for a toothed segment 66 of the gear assembly. Gearwheel 60, pinion 62 and toothed segment 66 are not shown in FIG. 5. The one end portion of cross member 56 is flared out into a positioning disk 68 to form the positioning system. In particular, pivot axis drillhole 64 is located in the root are of the flaring. As is shown in FIG. 3, the position of rotation axis drillhole 58 in cross member 56 is such that the axis of rotation and thus also gearwheel 60 and pinion 62 are positioned equidistantly between side members 32, 34. The axis of rotation is preferably located such that a center of gravity of the device lies on the axis of rotation when seat bench transport device 24 is in a home position.

As is indicated by the numbered elements in FIGS. 3 and 4, the gear assembly comprises two threaded rods 70, 72, gearwheel 60, pinion 62, toothed segment 66, two and one actuating element 74.

Threaded rods 70, 72 are positioned at a distance from and parallel to one another and extend in lengthwise direction x. Each has a threaded portion and a rod portion, via which each is connected to a retaining rail 28a, 28b.

Gearwheel 60 is supported such that it rotates about the axis of rotation that extends in vertical direction z through axis of rotation drillhole 58. It is disposed between threaded rods 70, 72 and meshes with both rods, so that when it rotates threaded rods 70, 72 are moved in opposite directions in lengthwise direction x. A helical spring, not shown, is anchored on the axis of rotation to bias retaining rails 28a, 28b towards the open position, and one end section of this spring acts on gearwheel 60 while the other end section acts on cross member 56.

Pinion 62 is supported on the axis of rotation of gearwheel 60 and meshes with toothed segment 66. It is permanently connected to gearwheel 60, so that a rotary motion of pinion 62 is transmitted to gearwheel 60.

Toothed segment 66 is pivotable about the pivot axis that extends in vertical direction z. It is pivoted via actuating element 74, which is permanently disposed on an axle pin 76 of toothed segment 66 for this purpose (FIG. 4).

Figure 8:
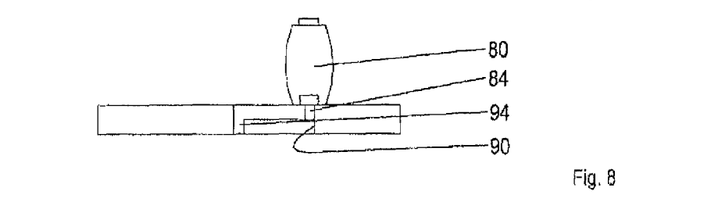
Figure 10:
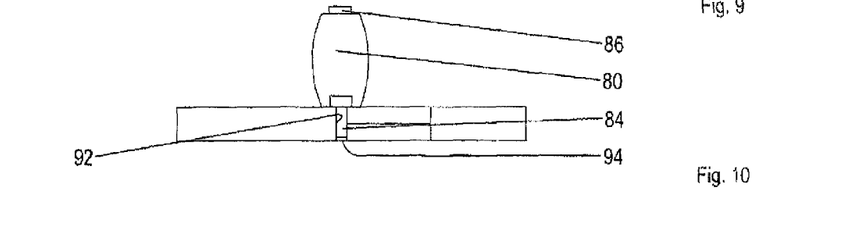

Actuating element 74 has a lever 78 that extends orthogonally to the pivot axis and a handle 80 that extends in vertical direction z. When lever 78 or handle 80 is moved clockwise, as represented in FIGS. 2 and 3, retaining rails 28a, 28b are moved toward one another. When lever 78 is moved counterclockwise, retaining rails 28a, 28b are moved apart. Handle 80 is movable within an elongated slot 82 extending in the longitudinal direction thereof such that it is radially displaceable when lever 78 is pivoted. At its foot it is equipped with a securing pin 84 that is displaceable in vertical direction z, and at its head it has a pushbutton 86 for withdrawing and inserting securing pin 84 (FIGS. 8 and 10).

The positioning system essentially comprises positioning disk 68, which constitutes a disk segment and in which a plurality of arc slots 88a, 88b, 88c, 88d is formed, as indicated by the numbered references in FIG. 5, for guiding handle 80 or a knob.

Arc slots 88a to 88d are offset relative to each other radially in respect of the pivot axis. In this context, they are offset relative to each other in such manner that when the distance between retaining rails 28a, 28b is smallest handle 80 engages in radially innermost arc slot 88a and when the distance between retaining rails 28a, 28b is greatest it engages in radially outermost arc slot 88d (FIGS. 2 and 3).

Arc slots 88a to 88d are positioned relative to each other in the pivot direction in such manner that each of the arc slots 88a to 88d corresponds to a seat rail distance. For example, in the illustrated first embodiment four arc slots 88a to 88d are provided and accordingly four seat bench distances may be represented. Each arc slot is connected at its radial limits with the respectively adjacent arc slots 88a to 88d, so that a staggered arc slot guide is formed. In particular, a laterally open overlap is formed between adjacent arc slots 88a to 88d, so that handle 80 is able to be moved from one of the arc slots 88a to 88d to the next arc slot 88a to 88d with a radial movement. Arc slots 88a to 88d have an arc length that corresponds to a travel distance of retaining rails 28a, 28b for each seat rail distance. Each is furnished with two limit stops 90, 92 for handle 80 at the opposite extremities thereof, limit stops 90 defining an opening or releasing position and the other limit stops 92 defining a closing or locking position of retaining rails 28a, 28b. In order to secure lever 78 in the respective locking position, a securing drillhole 94 is provided in the area of limit stops 92 at the locking extremity of each arc slot for the insertion of a securing pin 84.

Figure 7:
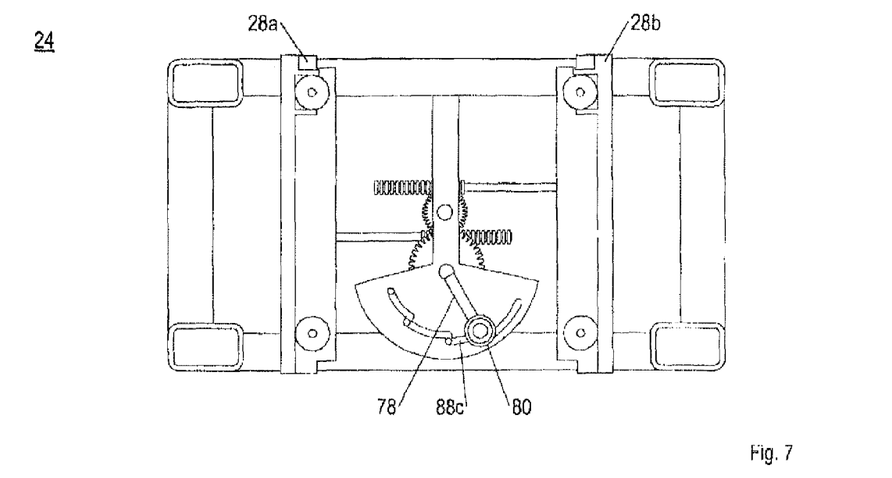
Figure 9:
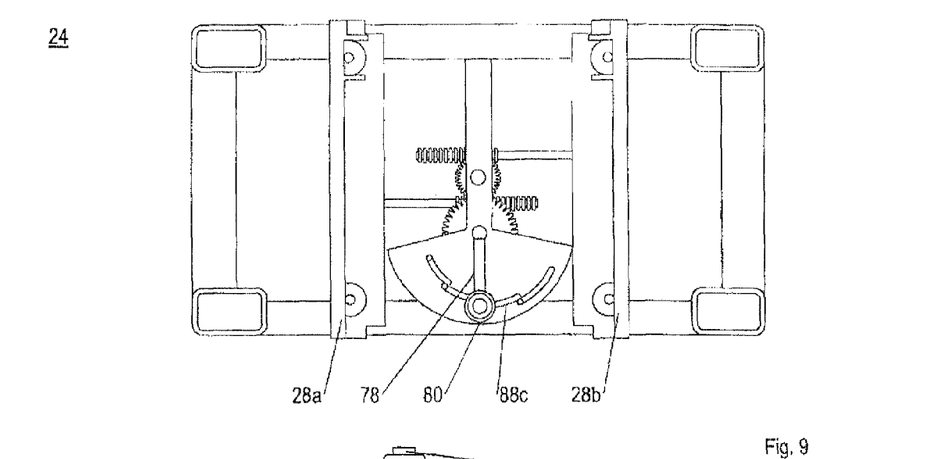

In the following, an operating mechanism according to the invention for seat bench transport device 1 as illustrated in FIGS. 7, 8, 9 and 10 will be explained:

Starting from the separation between retaining rails 28a, 28b in FIG. 7, a seat bench is to be secured in position on seat bench transport device 24. The preselected separation between retaining rails 28a, 28b is set according to the seat bench that is to be locked by appropriate positioning of handle 80, in the example of the figure in third arc slot 88c. As is shown in FIG. 8, securing pin 84 of handle 80 is retracted from securing drillhole 94, and retaining rails 28a, 28b are forced apart, in the opening direction, under the spring bias of the helical spring. As shown in FIG. 9, lever 78 is turned counterclockwise and handle 80 is moved to the left until it comes to rest against release end limit stop 90. Now the seat bench is placed on retaining rails 28a, 28b. To lock the seat bench, lever 78 is turned clockwise via handle 80, as shown in FIG. 9, until it comes to rest against locking end limit stop 92 and retaining rails 28a, 28b are moved to their locking positions. Then, as shown in FIG. 10, securing pin 84 is inserted into securing drillhole 94 by actuating pushbutton 86 to secure the locking position. Retaining rails 28a, 28b are now fixed in place and the seat bench is secured in lengthwise direction x and transverse direction y on seat bench transport device 24.

In order to dismount the seat bench, pushbutton 86 of handle 80 is pressed, and securing pin 84 is withdrawn from securing drillhole 94. Retaining rails 28a, 28b are then automatically moved apart into the open position as a result of the helical spring force, and handle 80 is moved counterclockwise as far as release end limit stop 90 (FIG. 8).

Figure 11:
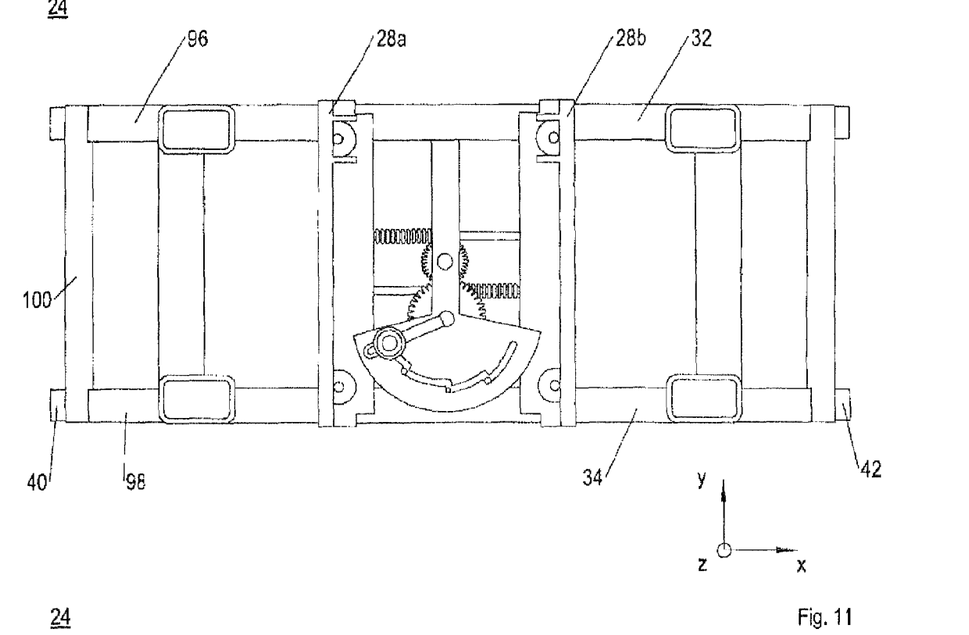
Figure 12:
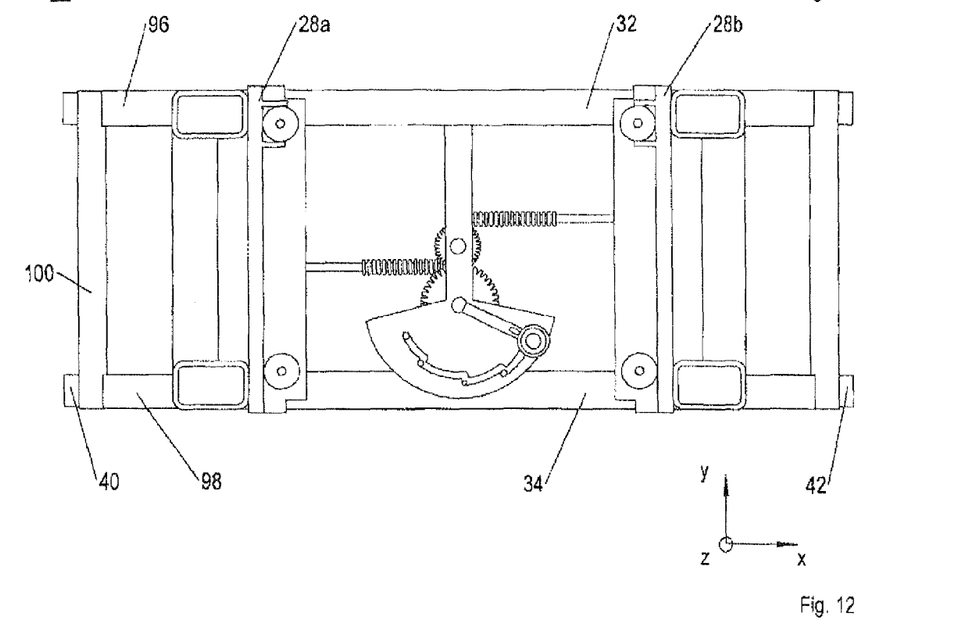
Figure 13:
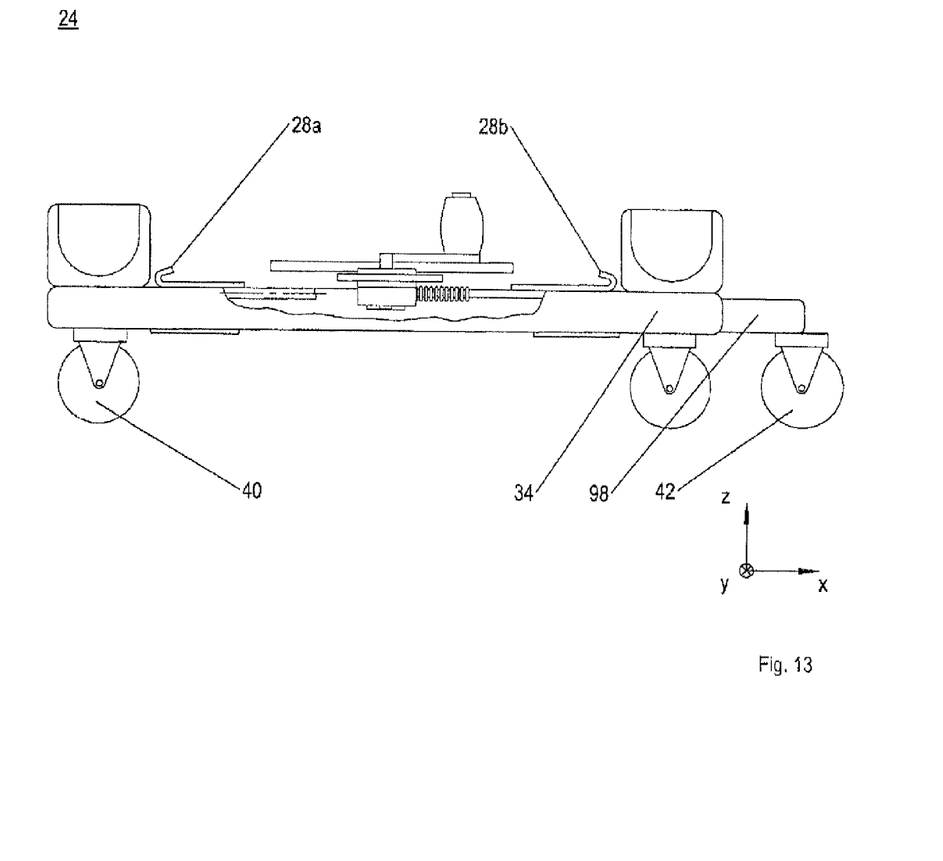

In order to enable a compensated position of the center of gravity of seat bench transport device 24 in the case of asymmetrical seat support beams, caster pairs 40, 42 are movable in lengthwise direction x relative to each other, as shown in FIGS. 11, 12 and 13. Caster pairs 40, 42 are each supported on two telescopic arms 96, 98, which are connected with one another via one transverse arm 100 for each. Telescopic arms 96, 98 extend through openings in the frontal faces of side members 32, 34, and are displaceable in lengthwise direction x inside these members. In order to secure telescopic arms 96, 98 in a desired lengthwise position, for example cross pins are provided, not shown in the figures, and are inserted in aligned pin holes in side members 32, 34 and telescopic arms 96, 98. As is shown in FIGS. 11 and 12, caster pairs 40, 42 may be moved regardless of the position of retaining rails 28a, 28b. Accordingly, there is no operative connection between displacement mechanism 30 for retaining rails 28a, 28b and telescopic arms 96, 98. As is shown in FIG. 13, caster pairs 40, 42 may also be moved individually, and for example the caster pair 42 on the right in FIG. 13 may be extended on its own.

Figure 14:
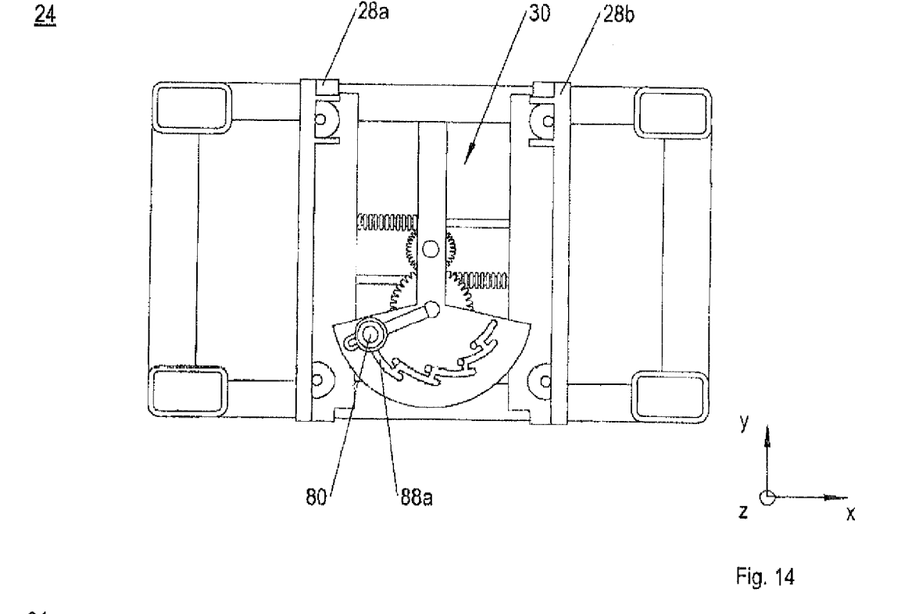
Figure 15:
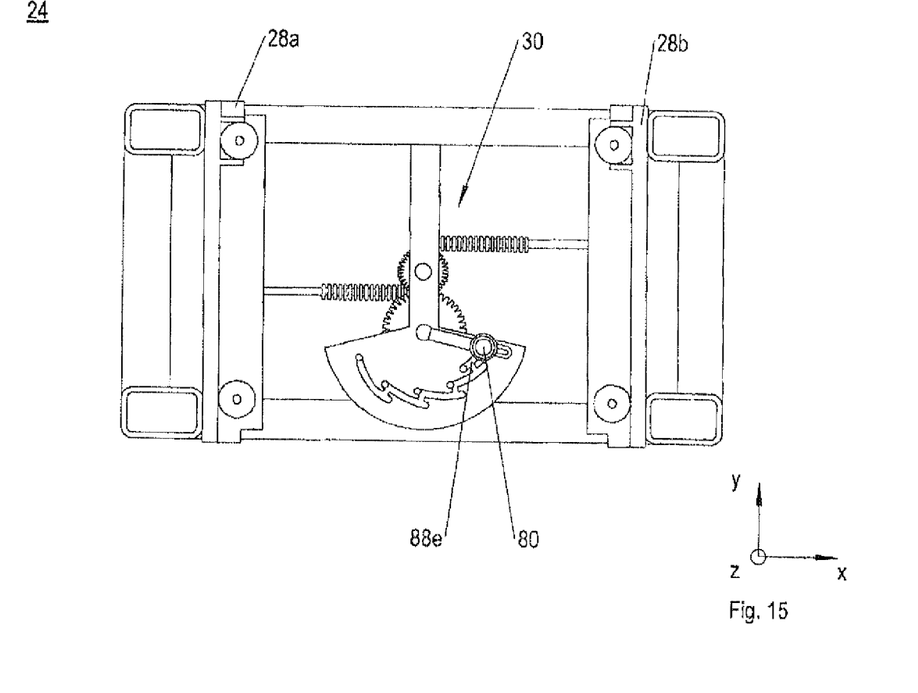
Figure 16:
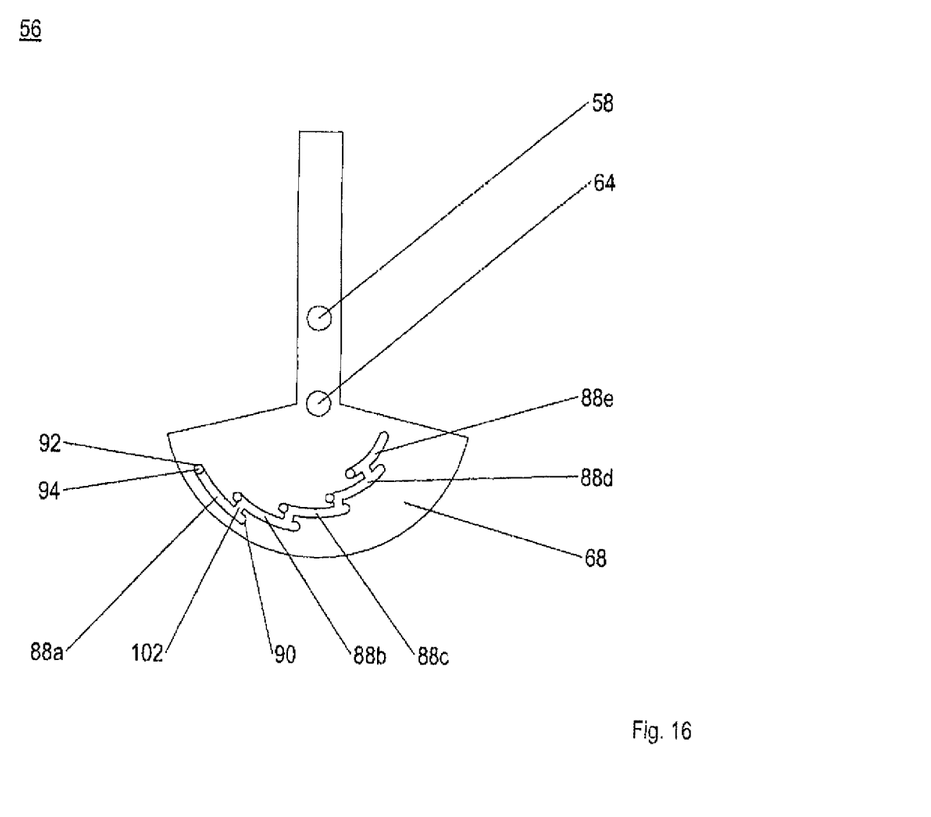

A second embodiment of the seat bench transport device 24 of the invention is depicted in the plan views of FIGS. 14 and 15 and the detail view of FIG. 16. Unlike the first embodiment illustrated in FIGS. 2 to 13, particularly FIGS. 2 to 5, the second embodiment is furnished with five arc slots 88a to 88e, so that five different seat bench distances may be reflected. Moreover, arc slots 88a to 88e are set apart from each other radially and thus also laterally, and they are joined to each other via a connecting radial slot 102. Arc slots 88a to 88e are each prolonged beyond connecting radial slot 102, thus creating blind limit stops 90, 92. In this way, in contrast to the first embodiment, handle 80 cannot be shifted from the opening position and the locking position in an arc slot 88a to 88e into an adjacent arc slot 88a to 88e with a radial motion, instead the handle 80 must be freed from blind limit stops 90, 92 by moving it backwards in the direction of the arc. A further difference from the first embodiment consists in that arc slots 88a to 88e are offset relative to each other in such manner that when the distance between retaining rails 28a, 28b is smallest handle 80 engages in the radially outermost arc slot 88a and when the distance between retaining rails 28a, 28b is greatest, handle 80 engages in the radially innermost arc slot 88e.

Figure 17:
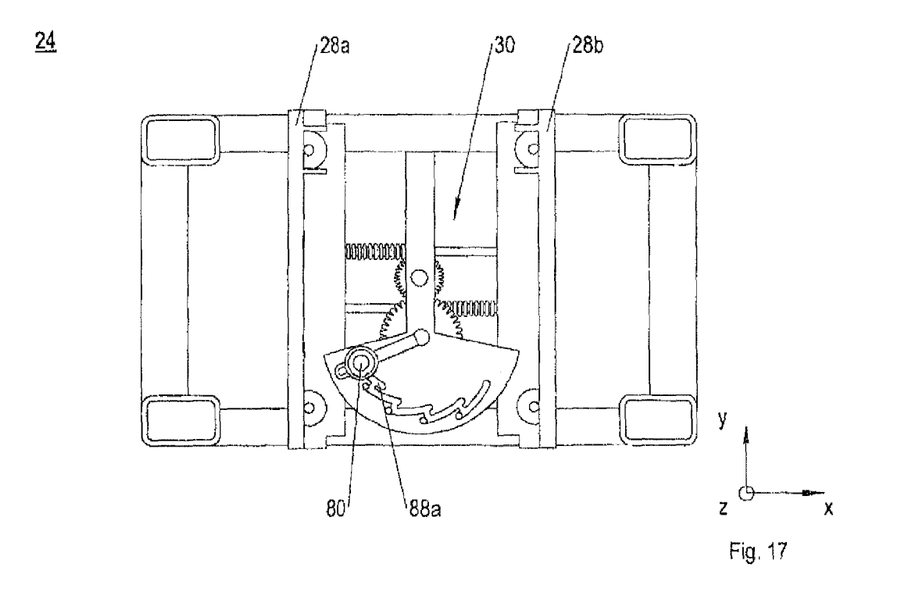
Figure 18:
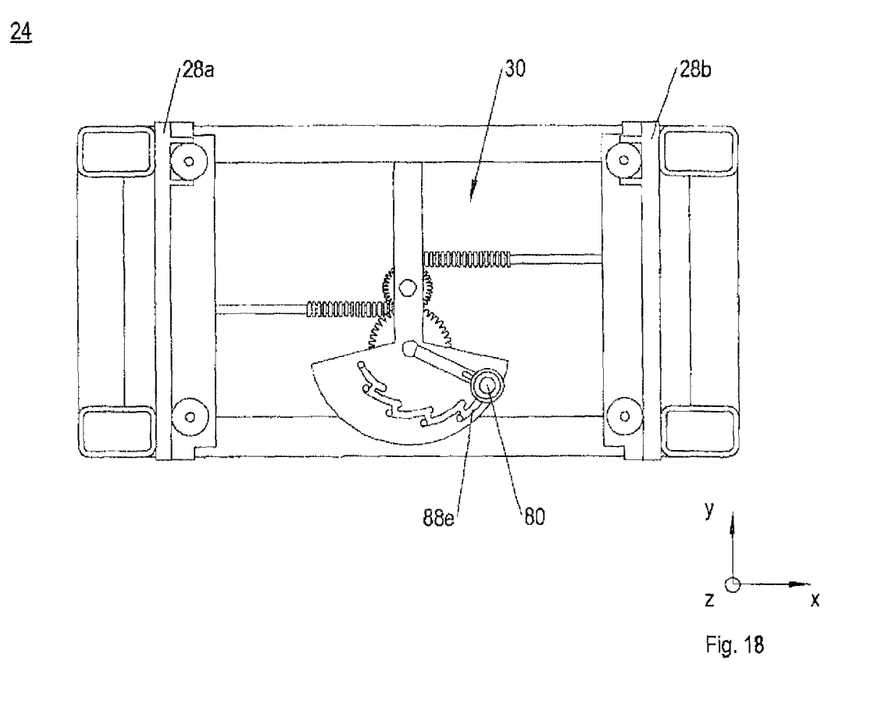
Figure 19:
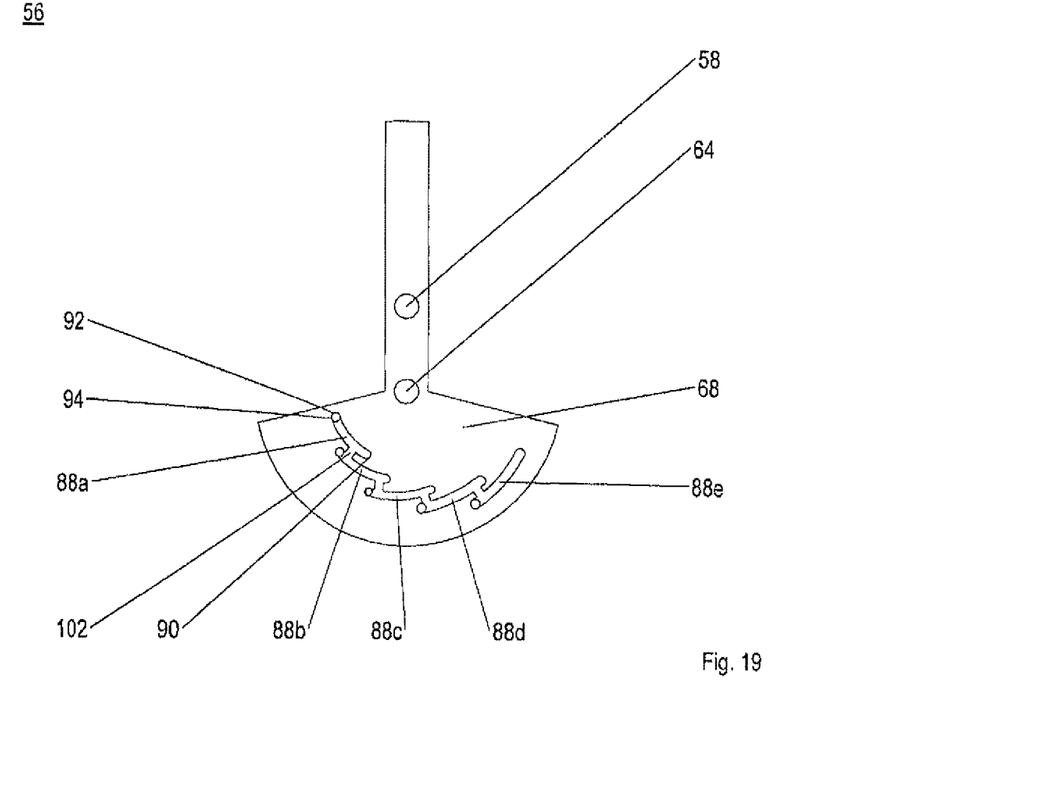

A third embodiment of seat bench transport device 24 according to the invention is presented in the plan views of FIGS. 17 and 18 and in the detail illustration of FIG. 19. Unlike the second embodiment represented in FIGS. 15, 16 and 17, arc slot 88a for setting a minimum distance between retaining rails 28a, 28b is radially innermost, and arc slot 88e for setting a maximum distance between retaining rails 28a, 28b is radially outermost.

Figure 20:
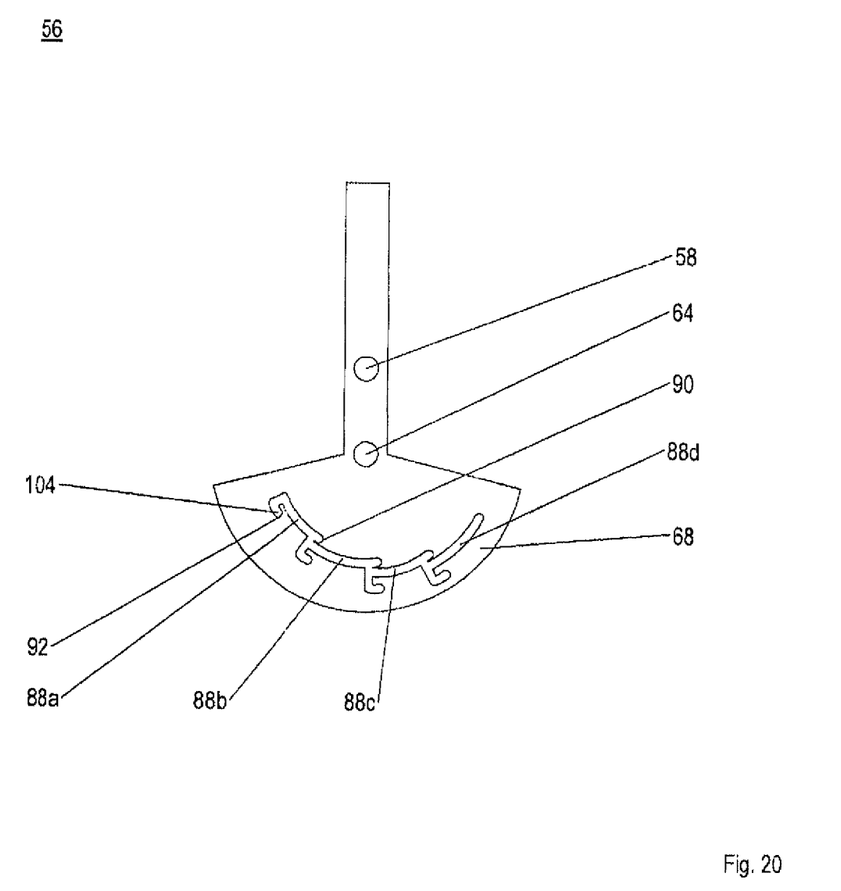

In the detail view in FIG. 20, a cross member 56 with a positioning disk 68 of a fourth embodiment of the seat bench transport device 24 according to the invention is shown. Positioning disk 68 is based on the first embodiment with four arc slots 88a to 88d, each of which is connected to the respective neighboring arc slots 88a to 88d laterally. In contrast to the previous embodiments, however, in this embodiment L-shaped offsets are formed at the ends of the slots instead of securing drillholes 90. Offsets 104 are arranged at the locking ends and are conformed radially outwardly from arc slots 88a to 88d. They lead back in the opening direction with an end section for the respective arc slot 88a to 88d and their orientation is accordingly counterclockwise. Each end section forms the locking end limit stop 92, against which handle 80 is pressed by the force of the helical spring. The opening side end sections 90 are arranged radially inwards relative to arc slots 88a to 88d and are aligned to extend at an angle to arc slots 88a to 88d. In this way, inadvertent opening of retaining rails 28a, 28b is reliably prevented. In particular, this offset variant enables handle 80 to have the form of a threaded bolt, for example, which extends in vertical direction z and is movable along extended slot 82 of lever 78. It is not necessary to insert and remove a securing pin 84, and so a pushbutton mechanism 86 is also unnecessary.

Figure 21:
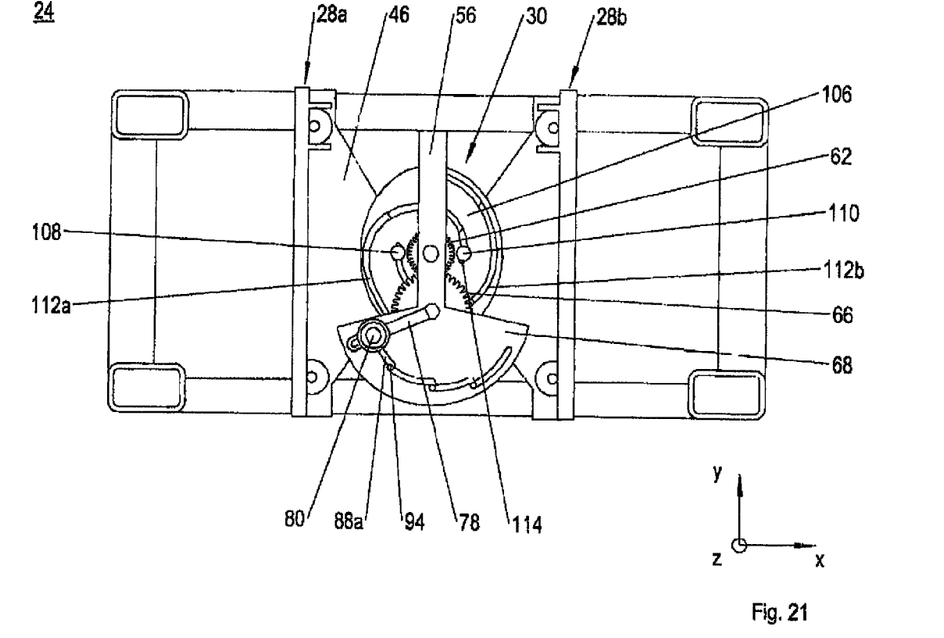
Figure 22:
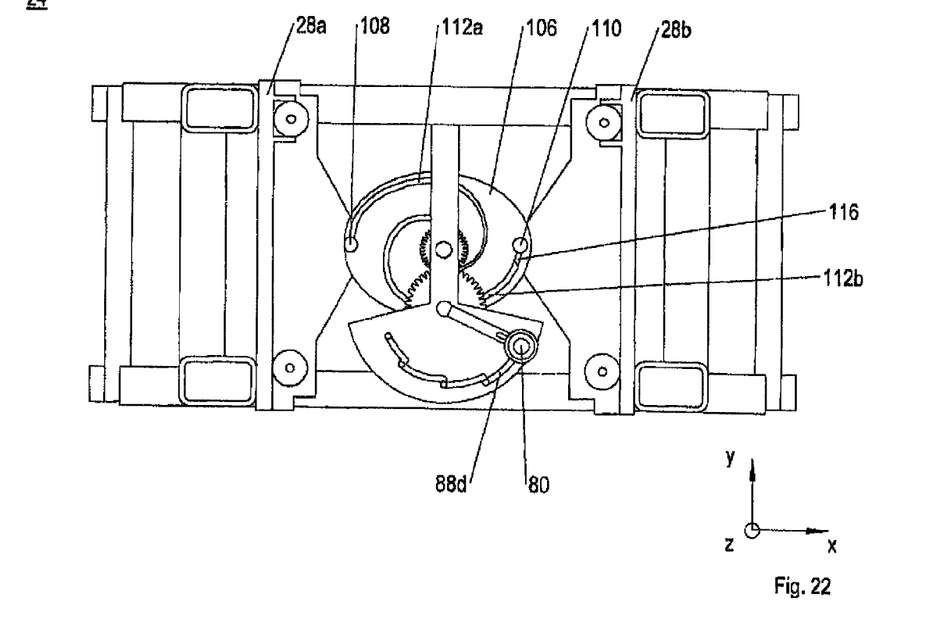

A fifth embodiment of the seat bench transport device 24 of the invention 24 is shown in FIGS. 21 and 22. Unlike the previous embodiments presented in FIGS. 2 to 20, this embodiment does not have a gear assembly with two threaded rods 70, 72 and a gearwheel 66 that meshes with threaded rods 70, 72. This fifth embodiment has a gear assembly with a link disk 106 and two guide bolts 108, 110. The other elements of the device, such as the cross member 56, pinion 62, toothed segment 66, positioning disk 68, lever and handle 80 are the same as in the preceding embodiments, particularly the first embodiment as shown in FIGS. 2 to 13 with regard to positioning disk 68 with four arc slots 88a to 88d that are in lateral contact with each other.

Link disk 106 is mounted so as to be rotatable about the axis of rotation of pinion 62, which is permanently attached to link disk 106. It has spiral slot pair that includes two spiral slots 112a, 112b, which have a curve radius that becomes smaller towards the axis of rotation when viewed in the clockwise direction, and accordingly converge radially from the outside inwards when viewed in the clockwise direction. In this context, their radial inner end portions 114 are located approximately on a transverse axis of link disk 106 and their radial outer end portions 116 are located on a longitudinal axis of link disk 106. As is shown in FIGS. 21 and 22, when a minimum separation between retaining rails 28a, 28b is set, link disk is oriented in transverse direction y, and when a maximum separation between retaining rails 28a, 28b is set, link disk is oriented in lengthwise direction x. Overall, the link disk is able to pivot through 270 .degree.

Guide bolts 108, 110 extend in vertical direction z and are individually connected to the middle of sliding portions 46 of retaining rails 28a, 28b, the opposing long sides of which are extended in a triangular form for this purpose. They extend in vertical direction z and each is movable in one of the spiral slots 112a, 112b. As is shown in FIG. 21, guide bolts 108, 110 are positioned in the area of inner end sections 114 of spiral slots 112a, 112b when the minimum separation between the retaining rails is set, and, as shown in FIG. 22, in the area of outer end sections 116 of spiral slots 112a, 112b when the maximum separation between the retaining rails is set.

Link disk 106 is controlled in the same way as in the preceding embodiments. A rotation of handle 80 or lever 78 is transmitted to toothed segment 66 and from this to pinion 62, from where the motion is transferred to link disk 106. Starting with retaining rails 28a, 28b at their closest position as shown in FIG. 21, when link disk 106 is rotated counterclockwise guide bolts 108, 110 are moved from the radially innermost position shown to the radially outermost position shown in FIG. 22. Because guide bolts 108, 110 are secured to sliding portions 46, the rotary motion of link disk 106 is transmitted to retaining rails 28a, 28b, which then execute a sliding movement in longitudinal direction x away from one another, as a result of which the distance between them increases. To move retaining rails 28a, 28b closer to one another, lever 78 must be turned in the opposite direction.

LIST OF REFERENCE NUMBERS

1 Outside device
2 Seat bench
4 Caster pair
6 Caster pair
8 Pallet
10a, b Seat rail
12 Seat
14 Seat
16 Seat
18 Seat support beams
20 Seat bench foot
22 Seat bench foot
24 Seat bench transport device
24' Seat bench transport device
26 Chassis
28a, b Retaining rail
30 Displacement mechanism
32 Side member
34 Side member 36 Transverse member
38 Transverse member
40, 40' Caster pair
42, 42' Caster pair
44 Caster recess
46 Sliding section
48 Locking section
50 Limiter
52 Limiter
54 Seating space
56 Cross member
58 Rotation angle drillhole
60 Gearwheel
62 Pinion
64 Pivot angle drillhole
66 Toothed segment
68 Positioning disk
70 Threaded rod
72 Threaded rod
74 Actuating element
76 Axle pin
78 Lever
80 Handle (knob)
82 Elongated slot
84 Securing pin
86 Pushbutton
88a, b, ... Arc slot
90 End stop
92 End stop
94 Securing drillhole
96 Telescopic arm
98 Telescopic arm
100 Transverse arm
102 Radial slot
104 Offset
106 Link disk
108 Guide bolt
110 Guide bolt
112a, b Spiral slot
114 Inner end section
116 Outer end section
x Lengthwise direction
y Transverse direction
z Vertical direction

The invention claimed is:

1. A seat bench transport device for transporting a seat bench for a vehicle, comprising:
   a chassis,
   a retaining rail pair disposed on the chassis and including two retaining rails that extend parallel to one another to accommodate seat bench feet, the lengthwise sides of the rails that face one another being open at least in sections and the lengthwise sides of the rails that face away from one another each having at least one locking section, and
   a displacement mechanism for moving the retaining rails transversely relative to one another, wherein the displacement mechanism comprises:
   two threaded rods aligned in a direction of displacement, each of which is allocated to one of the retaining rails,
   a gearwheel that is disposed between the threaded rods and meshes with the threaded rods, and
   an actuating element for driving the gearwheel.

2. The seat bench transport device of claim 1, wherein the retaining rails are simultaneously movable.

3. The seat bench transport device of claim 1, wherein the displacement mechanism comprises:
   a link disk with two spiral slots,
   two guide bolts on the retaining rail side for engaging in each of the spiral slots to transmit a pivoting motion of the link disk to the retaining rails, and
   an actuating element for driving the link disk.

4. The seat bench transport device of claim 1, wherein a pinion that is connected to the gearwheel is supported on an axis of rotation of the gearwheel, and is in operative connection with the actuating element.

5. The seat bench transport device of claim 3, wherein the spiral slots converge radially from an outside towards an inside.

6. The seat bench transport device of claim 5, wherein a pinion that is connected to the link disk is supported on an axis of rotation of the link disk, and is in operative connection with the actuating element.

7. The seat bench transport device of claim 1, wherein the actuating element is a lever with a handle, which is attached to a segment of the gearwheel of the displacement mechanism to transmit a rotary movement of the lever to the pinion.

8. The seat bench transport device of claim 7, wherein the displacement mechanism has a positioning disk, in which a plurality of arc slots is formed for guiding the handle, each of which has an arc length that corresponds to a travel distance between an open position and a closed position of the retaining rails for each seat bench rail distance.

9. The seat bench transport device of claim 8, wherein the retaining rails are spring-biased in an opening direction.

10. The seat bench transport device of claim 8, wherein the arc slots are radially offset with respect to each other and are connected with each other, and wherein the handle is shiftable in the lengthwise direction of the lever.

11. The seat bench transport device of claim 7, wherein the lever may be secured in a locking position for the retaining rails.

12. The seat bench transport device of claim 11, wherein at least one securing drillhole is provided in the arc slots to accommodate a securing pin of the handle.

13. The seat bench transport device of claim 11, wherein the arc slots each have an offset.

14. The seat bench transport device of claim 1, wherein the chassis includes casters which are movable relative to each other towards the retaining rails in the direction of displacement.

15. The seat bench transport device of claim 14, wherein the casters are disposed on telescopic arms, which are displaceable on the chassis.

* * * * *